(12) United States Patent
Saitou et al.

(10) Patent No.: US 8,047,325 B2
(45) Date of Patent: Nov. 1, 2011

(54) MOTOR VEHICLE STEERING SYSTEM

(75) Inventors: Yasuhiro Saitou, Okazaki (JP);
Hidetaka Otsuki, Kashiwara (JP);
Yasuaki Tsuji, Nara (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 12/810,510

(22) PCT Filed: Dec. 19, 2008

(86) PCT No.: PCT/JP2008/073237
§ 371 (c)(1),
(2), (4) Date: Jun. 24, 2010

(87) PCT Pub. No.: WO2009/081878
PCT Pub. Date: Jul. 2, 2009

(65) Prior Publication Data
US 2010/0282535 A1    Nov. 11, 2010

(30) Foreign Application Priority Data
Dec. 25, 2007   (JP) .................................. 2007-332709

(51) Int. Cl.
*B62D 5/04*   (2006.01)
(52) U.S. Cl. ....................................... 180/444; 180/443
(58) Field of Classification Search .................. 180/444, 180/4, 443, 440
See application file for complete search history.

(56) References Cited

U.S. PATENT DOCUMENTS

| | | | | |
|---|---|---|---|---|
| 5,906,250 | A * | 5/1999 | Haga et al. ..................... | 180/444 |
| 7,866,436 | B2 * | 1/2011 | Yamanaka ..................... | 180/444 |
| 2005/0039974 | A1 | 2/2005 | Hidaka | |
| 2007/0261909 | A1 * | 11/2007 | Higashi et al. ................ | 180/446 |
| 2008/0073143 | A1 * | 3/2008 | Yamanaka ..................... | 180/444 |
| 2008/0277192 | A1 * | 11/2008 | Nishimura .................... | 180/444 |
| 2009/0101431 | A1 * | 4/2009 | Yamanaka ..................... | 180/447 |
| 2009/0200100 | A1 | 8/2009 | Arbanas | |
| 2010/0170742 | A1 * | 7/2010 | Shimizu et al. ............... | 180/443 |
| 2010/0224436 | A1 * | 9/2010 | Shiina et al. .................. | 180/444 |

FOREIGN PATENT DOCUMENTS

| | | |
|---|---|---|
| JP | 63-212177 A | 9/1988 |
| JP | 05-105103 A | 4/1993 |
| JP | 09-132153 A | 5/1997 |
| JP | 11-105719 A | 4/1999 |
| JP | 2004-256087 A | 9/2004 |
| JP | 2005-067284 A | 3/2005 |
| JP | 2005-162124 A | 6/2005 |
| JP | 2006-046405 A | 2/2006 |
| JP | 2006-082718 A | 3/2006 |
| JP | 2007-145067 A | 6/2007 |
| JP | 2007-170624 A | 7/2007 |
| WO | WO-2006-048095 A1 | 5/2006 |

\* cited by examiner

*Primary Examiner* — Paul N Dickson
*Assistant Examiner* — Tashiana Adams
(74) *Attorney, Agent, or Firm* — Rabin & Berdo, PC

(57) ABSTRACT

A vehicle steering system including a transmission ratio variable mechanism that has a first shaft connected to a steering member and a second shaft connected to a turning mechanism, coupled coaxially to each other, and a transmission ratio variable mechanism motor disposed coaxially with the first and second shafts for driving the transmission ratio variable mechanism. The transmission ratio variable mechanism motor includes a tubular rotor, and an accommodation space is defined on the inner side in the radial direction of the tubular rotor. At least one of sensors is disposed inside the accommodation space.

11 Claims, 11 Drawing Sheets

MOTOR VEHICLE STEERING SYSTEM

TECHNICAL FIELD

The present invention relates to a motor vehicle steering system.

BACKGROUND ART

A transmission ratio variable mechanism capable of varying a transmission ratio as a ratio of an output rotation angle to an input rotation angle is known (for example, refer to Patent Documents 1 to 5).
Patent Document 1: Japanese Unexamined Patent Publication No. H05-105103
Patent Document 2: Japanese Unexamined Patent Publication No. 2004-256087
Patent Document 3: Japanese Unexamined Patent Publication No. 2005-162124
Patent Document 4: Japanese Unexamined Patent Publication No. 2005-67284
Patent Document 5: Japanese Unexamined Patent Publication No. 2007-145067

The transmission ratio variable mechanism includes, for example, as described in paragraph number [0015] of Patent Document 5 described above, a motor as a drive source and a harmonic drive gear as a differential mechanism. A rotation of a steering shaft accompanying a steering operation is superimposed on a rotation of the steering shaft based on the motor driving. Accordingly, the rotation of the steering shaft to be input into a rack and pinion mechanism is accelerated or decelerated so that a transmission ratio between a steering wheel and a turning wheel is altered.

In a motor vehicle steering system including this transmission ratio variable mechanism, it has been demanded to shorten an entire length of the system. An object of the present invention is to satisfy this demand.

SUMMARY OF THE INVENTION

Alphanumeric characters in parentheses shown below indicate reference symbols of corresponding components in the preferred embodiments described later, however, these reference symbols are not intended to limit the scope of claims.

A motor vehicle steering system of the present invention comprises a differential mechanism (5) that includes a first shaft (11) coupled to a steering member (2) and a second shaft (12) coupled to a turning mechanism (10), coupled coaxially to each other, and a transmission ratio variable motor (23) disposed coaxially with the first and second shafts for driving the differential mechanism (5), wherein the transmission ratio variable motor (23) includes a tubular rotor (231), and an accommodation space (90) is defined on the inner side in the radial direction of the rotor (231), and at least one of predetermined sensors (44; 44A, 43, and 45) that is provided in the motor vehicle steering system is disposed in the accommodation space (90).

According to the present invention, predetermined sensor and the rotor (231) can be disposed so as to overlap each other in the axial direction of the rotor (231), and the entire length of the system in the axial direction of the rotor (231) can be shortened.

In the present invention, the predetermined sensor may include steering state detection sensor (44; 44A, 43, and 45) that detects a steering state. In this case, the steering state detection sensor and the rotor (231) can be disposed so as to overlap each other in the axial direction of the rotor (231), and the entire length of the system in the axial direction of the rotor (231) can be further shortened.

In the present invention, the steering state detection sensor (44; 44A, 43, and 45) may have a signal detection section (116, 117, 119, 120, 121, and 45), and may include a torque sensor (44; 44A) that detects a torque to be applied to predetermined shaft member (12, 13) on a power transmission path (D) between the steering member (2) and the turning mechanism (10) by the signal detection section. In this case, the torque sensor (44; 44A) and the rotor (231) can be disposed so as to overlap each other in the axial direction of the rotor (231), so that the entire length of the system in the axial direction of the rotor (231) can be further shortened.

In the present invention, an electromagnetic shield member (122; 122A) is preferably disposed between the signal detection section (116, 117, 119, 120, 121, and 45) and the rotor (231). In this case, the sensor can be prevented from detecting electromagnetic noise from the outside.

The torque sensor may include an annular portion surrounding the predetermined shaft members, and the annular portion may include a ring-shaped first synthetic resin portion molding the signal detection section and the electromagnetic shield member.

In the present invention, preferably, a housing (24) for accommodating the rotor (231) is provided. This housing includes an outer tube (89) surrounding the outer periphery of the rotor (231), a joint wall (94) that extends inward in the radial direction from the outer tube (89) and neighbors with the rotor (231) in the axial direction (S) of the rotor (231), and an inner tube (93) extending in the accommodation space for the rotor (231) from the joint wall (94). The torque sensor (44; 44A) includes an annular portion (112; 112A) surrounding the shaft members (12 and 13), the inner tube (93) has a holding hole (123) for holding the annular portion (112; 112A), and the holding hole (123) is opened in the axial direction of the rotor (231) and can receive the annular portion (112; 112A) along a predetermined receiving direction along the axial direction of the rotor.

In this case, by the inner tube (93) of the housing, the annular portion (112; 112A) of the torque sensor (44; 44A) can be held in the accommodation space. The annular portion (112; 112A) can be inserted in the holding hole (123) along the axial direction, so that the torque sensor (44; 44A) can be disposed on the deeper side of the rotor (231), so that the dead space inside the rotor (231) can be effectively utilized.

In the present invention, the torque sensor (44; 44A) may include a radially extended portion (132) that extends outward in the radial direction of the annular portion (112; 112A) from the annular portion (112; 112A) and neighbors the rotor (231) in the axial direction of the rotor (231). In this case, the portion connected to the annular portion (112; 112A) can be extended outward in the radial direction of the rotor (231).

Accordingly, for example, an electric wire (126) that transmits torque detection signals from the signal detection section can be inserted in the annular portion (112; 112A) and the radially extended portion (321) and extended to the outside of the rotor (231). As a result, torque detection signals can be transmitted to a controller, etc., outside the rotor (231).

The radially extended portion may be formed by a second synthetic resin portion.

In the present invention, the steering state detection sensor (44; 44A, 43, and 45) may include a rotation angle detection sensor (43, 45) that detects a rotation angle of the predetermined shaft members or rotor (231) on the power transmission path between the steering member (2) and the turning mechanism (10). In this case, the rotation angle detection sensor and the rotor (231) can be disposed so as to overlap each other in the axial direction of the rotor (231), and the entire length of the system in the axial direction of the rotor (231) can be further shortened.

In the present invention, an electromagnetic shield member can be disposed between the signal detection section (116, 117, 119, 120, 121, and 45) of the steering state detection sensor and the rotor (231).

The above-described and other advantages, features, and effects of the present invention will become more apparent from the following description of preferred embodiments with reference to the attached drawings.

DESCRIPTION OF REFERENCE NUMERALS

1: Motor vehicle steering system, 2: Steering member, 5: Transmission ratio variable mechanism (differential mechanism), 10: Turning mechanism, 11: First shaft (first axis), 12: Second shaft (second axis, predetermined shaft member), 13: Third shaft (predetermined shaft member), 23: Transmission ratio variable mechanism motor (transmission ratio variable motor), 24: Housing, 43: Motor resolver (predetermined sensor, steering state detection sensor, rotation angle detection sensor), 44, 44A: Torque sensor (predetermined sensor, steering state detection sensor), 45: Steered angle sensor (predetermined sensor, steering state detection sensor, rotation angle detection sensor), 89: Accommodation space, 93: Inner tube, 94: Joint wall, 108: Resolver stator, 112, 112A: annular portion, 116, 117: Magnetic yoke (signal detection section) 119, 120: Magnet collecting ring (signal detection section), 121: Hall IC (signal detection section), 122, 122A: Electromagnetic shield member, 123: Holding hole, 132: Second synthetic resin portion (radially extended portion), 231: Rotor (of transmission ratio variable mechanism motor), 452: Stator (signal detection section) (of steered angle sensor), D: Power transmission path, F1: Receiving direction, S: Axial direction, θr: Rotation angle (of rotor)

DETAILED DESCRIPTION OF PREFERRED EMBODIMENTS

Figure 1:
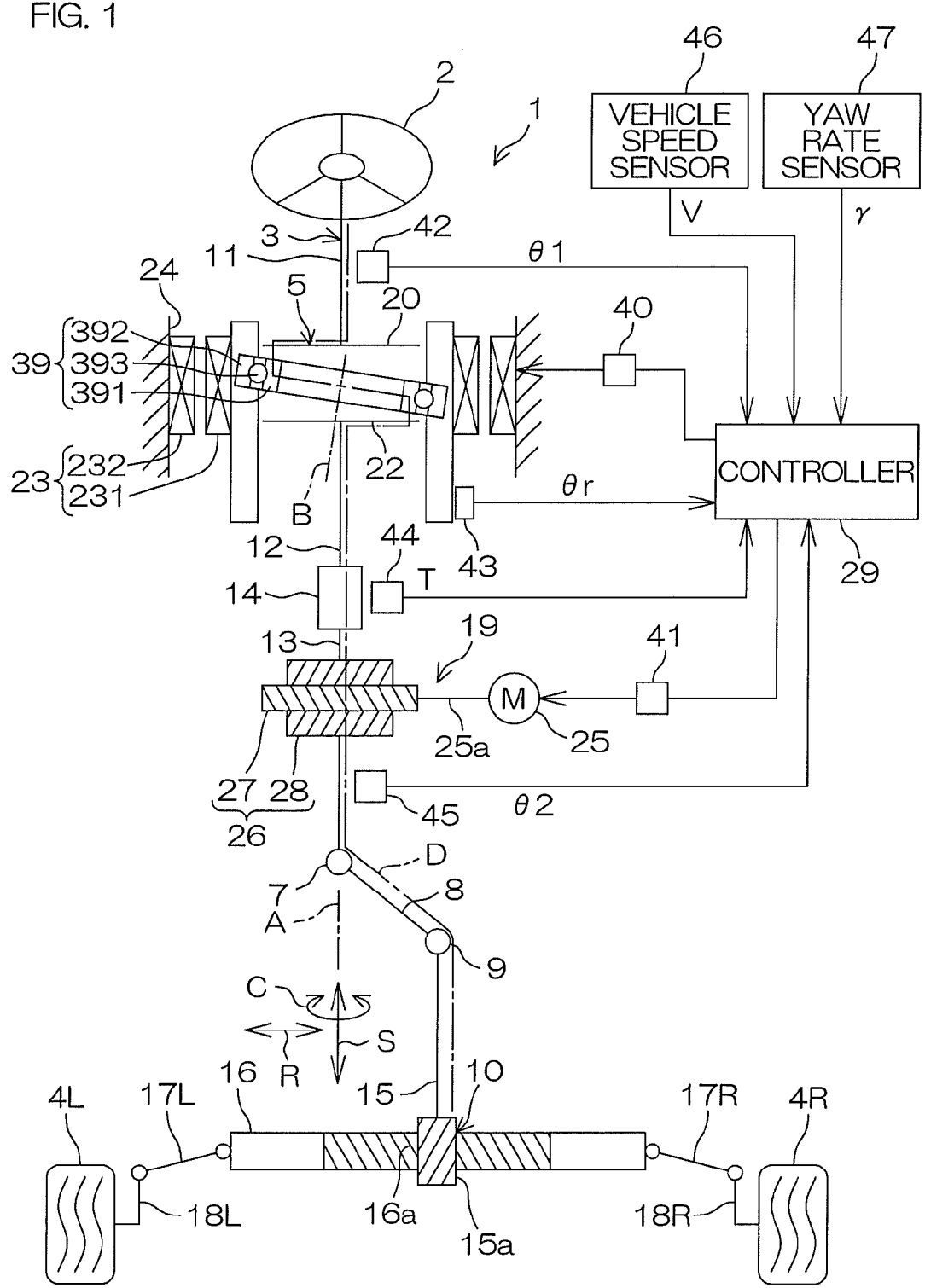
FIG. 1 is a view showing a schematic arrangement of a motor vehicle steering system including a transmission ratio variable mechanism according to a preferred embodiment of the present invention.

FIG. 1 is a schematic view showing a general arrangement of a motor vehicle steering system 1 including a transmission ratio variable mechanism according to a preferred embodiment of the present invention.

The motor vehicle steering system 1 performs steering by supplying a steering torque imparted to a steering member 2 such as a steering wheel, etc., to right and left turning wheels 4R and 4L via a steering shaft 3, etc. The motor vehicle steering system 1 has a VGR (Variable Gear Ratio) function capable of varying a transmission ratio θ2/θ1 of the steered angle θ2 of the turning wheels to the steering angle θ1 of the steering member 2.

The motor vehicle steering system 1 includes the steering member 2 and the steering shaft 3 connected to the steering member 2. The steering shaft 3 includes first to third shafts 11 to 13 disposed mutually coaxially. The first axis A that is the central axis of the first to third shafts 11 to 13 is also a rotation axis of the first to third shafts 11 to 13.

Hereinafter, the axial direction S of the steering shaft 3 is simply referred to as "axial direction S," and the radial direction R of the steering shaft 3 is simply referred to as "radial direction R," and the circumferential direction C of the steering shaft 3 is simply referred to as "circumferential direction C."

To one end of the first shaft 11, the steering member 2 is coupled rotatably. The other end portion of the first shaft 11 and one end portion of the second shaft 12 are coupled differentially rotatably via a transmission ratio variable mechanism 5 as a differential mechanism. The other end of the second shaft 12 and one end of the third shaft 13 are coupled so as to elastically rotate relative to each other and transmit power via a torsion bar 14. Hereinafter, "one end" means an end close to the steering member 2, and "the other end" means an end close to the turning mechanism 10.

The other end of the third shaft 14 is connected to turning wheels 4R and 4L via a universal joint 7, an intermediate shaft 8, a universal joint 9, and a turning mechanism 10, etc.

The turning mechanism 10 includes a pinion shaft 15 coupled to the universal joint 9, and a rack shaft 16 as a steering shaft that has a rack 16a to engage with a pinion 15a on the tip end of the pinion shaft 15 and extends in the right-left direction of the motor vehicle. To a pair of end portions of the rack shaft 16, knuckle arms 18R and 18L are coupled via tie rods 17R and 17L, respectively.

With the above arrangement, the rotation of the steering member 2 is transmitted to the turning mechanism 10 via the steering shaft 3, etc. In the turning mechanism 10, the rotation of the pinion 15a is converted into a movement in the axial direction of the rack shaft 16. The movement in the axial direction of the rack shaft 16 is transmitted to the corresponding knuckle arms 18R and 18L via the tie rods 17R and 17L, and these knuckle arms 18R and 18L turn. Accordingly, the corresponding turning wheels 4R and 4L coupled to the knuckle arms 18R and 18L are turned.

The transmission ratio variable mechanism 5 is for varying the rotation transmission ratio (transmission ratio $\theta2/\theta1$) between the first and second shafts 11 and 12 of the steering shaft 3. This transmission ratio variable mechanism 5 includes an input member 20 provided on the other end portion of the first shaft 11, an output member 22 provided on one end portion of the second shaft 12, and a bearing ring unit 39 interposed between the input member 20 and the output member 22.

The input member 20 is coupled to the first shaft 11 coaxially and rotatably, and the output member 22 is coupled to the second shaft 12 coaxially and rotatably. The first axis A is commonly the central axis and the rotation axis of the input member 20 and the output member 22.

The output member 22 is connected to the turning wheels 4R and 4L via the second shaft 12 and the turning mechanism 10.

The bearing ring unit 39 has a second axis B as a central axis inclined with respect to the first axis A, and includes an inner race 391 as a first bearing ring, an outer race 392 as a second bearing ring, and rollers 393 such as balls interposed between the inner race 391 and the outer race 392.

The inner race 391 couples the input member 20 and the output member 22 differentially rotatably, and engages with the input member 20 so as to transmit rotation and engages with the output member 22 so as to transmit rotation. The inner race 391 is supported rotatably on the outer race 392 via the rollers 393, and accordingly, it is rotatable around the second axis B. The inner race 391 is provided with a transmission ratio variable mechanism motor 23 as an actuator for driving the outer race 392. The inner race 392 is rotatable around the first axis A according to driving of the transmission ratio variable mechanism motor 23. The inner race 391 can coriolis-move (nutates) around the first axis A.

The transmission ratio variable mechanism motor 23 is a brushless motor disposed coaxially with the steering shaft 3, and is disposed coaxially with the first and second shafts 11 and 12 for driving the transmission ratio variable mechanism 5. The first axis A is a central axis of the first and second shafts 11 and 12. The transmission ratio variable mechanism motor 23 alters the transmission ratio $\theta2/\theta1$ by changing the rotation speed of the outer race 392 around the first axis A.

The transmission ratio variable mechanism motor 23 includes (i) a tubular rotor 231 that holds the bearing ring unit 39 and (ii) a stator 232 that surrounds the rotor 231 and is fixed to the housing 24.

The motor vehicle steering system 1 also includes a steering-assist-force imparting mechanism 19 for imparting a steering assist force to the steering shaft 3. The steering-assist-force imparting mechanism 19 includes the above-described second shaft 12 as an input shaft coupled to the output member 22 of the transmission ratio variable mechanism 5, the above-described third shaft 13 as an output shaft coupled to the turning mechanism 10, a torque sensor 44 as a steering state detection sensor that detects a torque transmitted between the second shaft 12 and the third shaft 13, a steering assisting motor 25 as a steering assisting actuator, and a reduction gear mechanism 26 interposed between the steering assisting motor 25 and the third shaft 13.

The steering assisting motor 25 consists of an electric motor such as a brushless motor. An output of this steering assisting motor 25 is configured to transmit to the third shaft 13 via the reduction gear mechanism 26.

The reduction gear mechanism 26 is, for example, a worm gear mechanism. The reduction gear mechanism 26 includes a worm shaft 27 as a drive gear coupled to an output shaft 25a of the steering assisting motor 25, and a worm wheel 28 as a driven gear that is engaged with the worm shaft 27 and coupled to the third shaft 13 rotatably.

The transmission ratio variable mechanism 5 and the steering-assist-force imparting mechanism 19 are housed in the housing 24. The housing 24 is disposed in a cabin of the motor vehicle. The housing 24 may be disposed so as to surround the intermediate shaft 8, or may be disposed in the engine room of the motor vehicle.

Drives of the transmission ratio variable mechanism motor 23 and the steering assisting motor 25, respectively, are controlled by a controller 29 including a CPU, a RAM, and a ROM. The controller 29 is connected to the transmission ratio variable mechanism motor 23 via a driving circuit 40, and connected to the steering assisting motor 25 via a driving circuit 41.

To the controller 29, a steering angle sensor 42, a motor resolver 43 as a rotation angle detection sensor for detecting a rotation angle of the rotor 231 of the transmission ratio variable mechanism motor 23, a torque sensor 44, a steered angle sensor 45, a vehicle speed sensor 46, and a yaw rate sensor 47 are connected.

From the steering angle sensor 42 to the controller 29, a signal concerning a rotation angle of the first shaft 11 is input as a value corresponding to a steering angle $\theta1$ as an operation amount from a straight traveling position of the steering member 2.

From the motor resolver 43 to the controller 29, a signal concerning a rotation angle $\theta r$ of the rotor 231 of the transmission ratio variable mechanism motor 23 is input.

From the torque sensor 44 to the controller 29, a signal concerning a torque applied between the second and third shafts 12 and 13 is input as a value corresponding to a steering torque T to be applied to the steering member 2.

From the steered angle sensor 45 to the controller 29, a signal concerning a rotation angle of the third shaft 13 is input as a value corresponding to the steered angle $\theta2$.

From the vehicle speed sensor 46 to the controller 29, a signal concerning a vehicle speed V is input.

From the yaw rate sensor 47 to the controller 29, a signal concerning a yaw rate $\gamma$ of the motor vehicle is input.

The controller 29 controls drives of the transmission ratio variable mechanism motor 23 and the steering assisting motor 25 based on the signals, etc., of the respective sensors 42 to 47 described above.

With the above-described arrangement, the torque from the steering member 2 and the torque from the transmission ratio variable mechanism 5 are transmitted to the turning mechanism 10 via the steering-assist-force imparting mechanism 19. In detail, the steering torque input into the steering member 2 is input into the input member 20 of the transmission ratio variable mechanism 5 via the first shaft 11, and input into the inner race 391 from the input member 20. To the inner race 391, in addition to the torque from the steering member 2, a torque from the transmission ratio variable mechanism motor 5, that was transmitted to the inner race 391 via the outer race 392 and the rollers 393, is transmitted, and these torques are transmitted to the output member 22. The torques transmitted to the output member 22 are transmitted to the second shaft 12. The torque transmitted to the second shaft 12 is transmitted to the torsion bar 14 and the third shaft 13, and transmitted to the turning mechanism 10 via the universal joint 7, the intermediate shaft 8, and the universal joint 9 together with an output from the steering assisting motor 25.

Thus, a power transmission path D for transmitting a torque of the steering member 2 to the turning mechanism 10 is formed. This power transmission path D passes through the first shaft 11, the input member 20, the inner race 391, the output member 22, the second shaft 12, the torsion bar 14, the third shaft 13, the universal joint 7, the intermediate shaft 8, and the universal joint 9.

Figure 2:
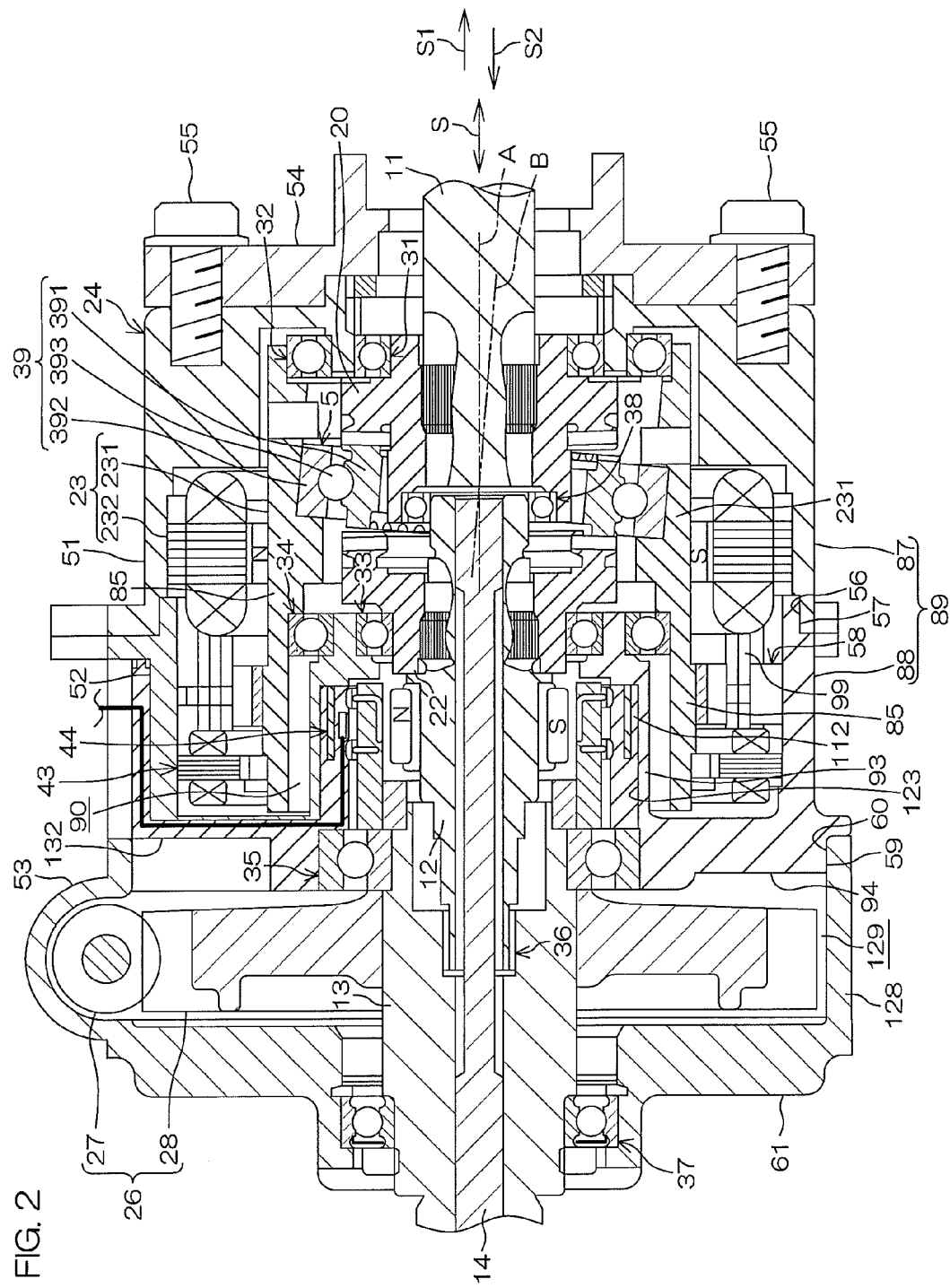
FIG. 2 is a partial sectional view showing a detailed arrangement of the motor vehicle steering system.

FIG. 2 is a partial sectional view showing a detailed arrangement of an essential portion of FIG. 1. The housing 24 is formed to have a tubular shape as a whole with a metal such as aluminum alloy, and includes first to third housings 51 to 53.

The first housing 51 has a tubular shape. The first housing 51 is a differential mechanism housing for accommodating the transmission ratio variable mechanism 5 as a differential mechanism, and constitutes a motor housing for accommodating the transmission ratio variable mechanism motor 23 in cooperation with the second housing 52. One end of the first housing 51 is covered by an end wall member 54. One end of the first housing 51 and the end wall member 54 are fixed to each other by using a fastening member 55 such as a bolt. To the inner peripheral surface 56 on the other end of the first housing 51, an annular protruding portion 57 on one end of the second housing 52 is fitted. These first and second housings 51 and 52 are fixed to each other by using a fastening member (not shown) such as a bolt.

The second housing 52 has a tubular shape. The second housing 52 is a sensor housing for accommodating a torque sensor 44, a resolver housing for accommodating a motor resolver 43, and a part of a motor housing for accommodating the transmission ratio variable mechanism motor 23. The second housing 52 houses a bus bar 99 described later and a lock mechanism 58 for locking the rotor 231 of the transmission ratio variable mechanism motor 23. An inner peripheral surface 60 on one end of the third housing 53 is fitted to the outer peripheral surface 59 on the other end of the second housing 52.

The third housing 53 has a tubular shape, and is a reduction gear mechanism housing for accommodating the reduction gear mechanism 26. On the other end of the third housing 53, an end wall portion 61 is provided. The end wall portion 61 has an annular shape, and closes the other end of the third housing 53.

Figure 3:
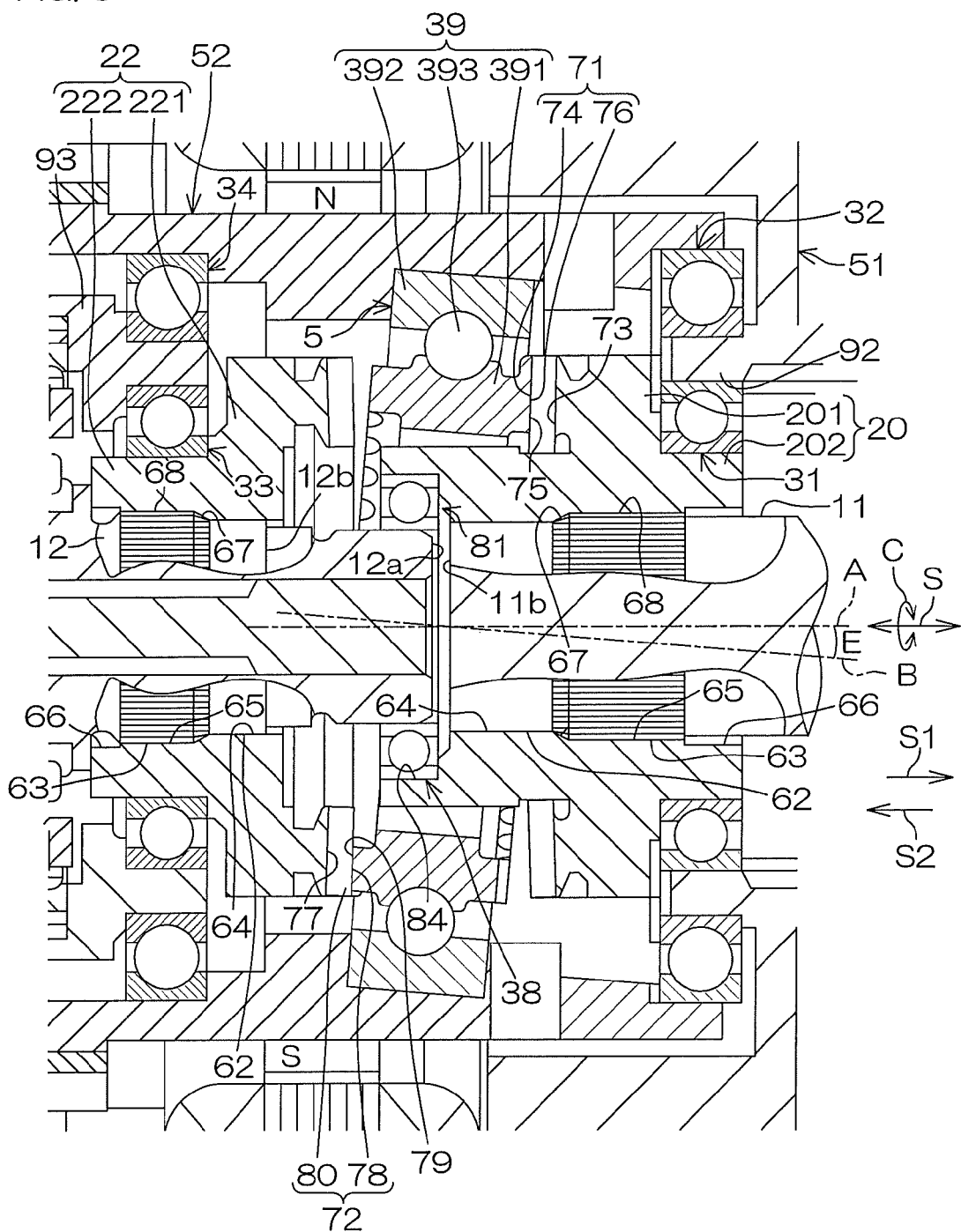
FIG. 3 is an enlarged view of the vicinity of facing end portions of a first shaft and a second shaft.

FIG. 3 is an enlarged view of the vicinity of the facing end portions 11b and 12a of the first shaft 11 and the second shaft 12 of FIG. 2. Referring to FIG. 3, the input member 20 and the output member 22 of the transmission ratio variable mechanism 5 and the bearing ring unit 39 are annular.

An entire of the input member 20 is formed integrally by using a single member, and includes an input member main body 201 and an input member side tubular portion 202 disposed on the inner side in the radial direction of the input member main body 201.

The input member main body 201 is supported rotatably on an annular protruding portion 92 described later of the first housing 51 via a first bearing 31.

A first shaft 11 is inserted through the input member side tubular portion 202, so that the input member side tubular portion 202 and the first shaft 11 are coupled rotatably.

In detail, the other end portion 11b of the first shaft 11 includes a press-fitting portion 62 formed by a cylindrical surface and a male serration portion 63 disposed on one side S1 in the axial direction S with respect to the press-fitting portion 62. The inner peripheral surface of the input member side tubular portion 202 includes a press-fitted portion 64 formed by a cylindrical surface, a female serration portion 65 disposed on one side S1 in the axial direction S with respect to the press-fitted portion 64, and a large diameter portion 66 that is disposed on one side S1 in the axial direction S with respect to the female serration portion 64 and formed to have a diameter larger than the outer diameter of the first shaft 11.

The male serration portion 63 of the first shaft 11 includes a guide portion 67 connected to the press-fitting portion 62, and a male serration portion main body 68 that is disposed on one side S1 in the axial direction S continuously to the guide portion 67 and has a fixed outer diameter.

The guide portion 67 of the first shaft 11 is used as a guide of insertion of the male serration portion 63 into the female serration portion 65. The outer diameter of the guide portion 67 becomes larger as it goes toward one side S1 in the axial direction S, and the minimum diameter of the guide portion 67 is substantially equal to the outer diameter of the press-fitting portion 62, and the maximum diameter is substantially equal to the outer diameter of the male serration portion main body 68.

In the axial direction S, the male serration portion 63 is formed to be relatively long and the press-fitting portion 62 is formed to be relatively short.

The press-fitted portion 64 of the input member 20 has a length in the axial direction S substantially equal to that of the press-fitting portion 62. By press-fitting and fixing these press-fitting portion 62 and press-fitted portion 64 to each other, the first shaft 11 and the input member 20 are coupled rotatably. A permissible transmission torque between these press-fitting portion 62 and press-fitted portion 64 is set to, for example, approximately 20 N·m, and in a normal steering state, a torque is transmitted between these press-fitting portion 62 and press-fitted portion 64.

The female serration portion 65 of the input member 20 has a length in the axial direction S set substantially equal to that of the male serration portion 63, and is fitted to the male serration portion 63. Between tooth portions of these serration portions 63 and 65, a predetermined gap is provided in the circumferential direction C such that in a normal steering state, no torque is transmitted between these serration portions 63 and 65.

For example, when an extremely large inverted input is applied from each of the turning wheels 4R and 4L, this inverted input is transmitted to a portion between the input member 20 and the first shaft 11 via the third shaft 13, etc., and a torque (for example, 200 N·m to 300 N·m) exceeding the permissible transmission torque is applied between the press-fitted portion 64 and the press-fitting portion 62, slipping occurs between these press-fitted portion 64 and the press-fitting portion 62, and accordingly, the tooth portions of the serration portions 63 and 65 engage with each other. Then, the torque is transmitted between the serration portions 63 and 65, and accordingly, the torque is transmitted between the input member 20 and the first shaft 11.

In the normal steering state, it is permissible that the gap between the tooth portions of the serration portions 63 and 65 is narrowed and the tooth portions are brought into slight pressure contact (light pressure contact) with each other. Accordingly, when slipping occurs between the press-fitting portion 62 and the press-fitted portion 64 of the first shaft 11, the tooth portions of the serration portions 63 and 65 come into contact with each other and rattling noise can be reduced.

The output member 22 is formed integrally as a whole with a single member, and includes an output member main body 221 and an output member side tubular portion 222 disposed on the inner side in the radial direction of the output member main body 221.

The output member main body 221 is supported rotatably on a tip end portion of the inner tube 93 described later of the second housing 52 via a third bearing 33.

The second shaft 12 is inserted through the output member side tubular portion 222, and these output member side tubular portion 222 and the second shaft 12 are coupled rotatably.

In detail, the intermediate portion 12b of the second shaft 12 includes the press-fitting portion 62 formed by a cylindrical surface and the male serration portion 63 disposed on the other side S2 in the axial direction S with respect to the press-fitting portion 62. The inner peripheral surface of the output member side tubular portion 222 includes the press-fitted portion 64 formed by a cylindrical surface, the female serration portion 65 disposed on the other side S2 in the axial direction S with respect to the press-fitted portion 64, and a large diameter portion 66 that is disposed on the other side S2 in the axial direction S with respect to the female serration portion 65 and formed to have a diameter larger than the outer diameter of the intermediate portion 12b of the second shaft 12.

The outer diameter of one end portion 12a of the second shaft 12 is set to be smaller than the minimum diameter of the inner peripheral surface of the output member 22, and this one end portion 12a can be loosely fitted on the output member side tubular portion 222.

The male serration portion 63 of the second shaft 12 includes a guide portion 67 connected to the press-fitting portion 62 of the second shaft 12, and a male serration portion main body 68 that is disposed continuously to the other side S2 in the axial direction S with respect to the guide portion 67 and has a fixed outer diameter.

The guide portion 67 of the second shaft 12 is used as a guide of insertion of the male serration portion 63 into the female serration portion 65. The outer diameter of the guide portion 67 of the second shaft 12 becomes larger as it goes toward the other side S2 in the axial direction S, and the minimum diameter of the guide portion 67 is substantially equal to the outer diameter of the press-fitting portion 62, and the maximum diameter is substantially equal to the outer diameter of the male serration portion main body 68.

In the axial direction S, the male serration portion 63 is formed to be relatively long, and the press-fitting portion 62 is formed to be relatively short.

The press-fitted portion 64 of the output member 22 is set to have a length in the axial direction S substantially equal to that of the press-fitting portion 62. By press-fitting and fixing these press-fitting portion 62 and press-fitted portion 64 to each other, the second shaft 12 and the output member 22 are coupled rotatably. A permissible transmission torque between these press-fitting portion 62 and press-fitted portion 64 is set to, for example, approximately 20 N·m, and in a normal steering state, a torque is transmitted between these press-fitting portion 62 and press-fitted portion 64.

The female serration portion 65 of the output member 22 is set to have a length in the axial direction S substantially equal to that of the male serration portion 63 of the second shaft 12, and is fitted to the male serration portion 63. Between tooth portions of these serration portions 63 and 65, a predetermined gap is provided in the circumferential direction C such that in a normal steering state, no torque is transmitted between these serration portions 63 and 65.

For example, an extremely large inverted input is applied from each of the turning wheels 4R and 4L, and this inverted input is transmitted to a portion between the output member 22 and the second shaft 12 via the third shaft 13, etc., and a torque (for example, 200 N·m to 300 N·m) exceeding the permissible transmission torque is applied between the press-fitted portion 64 and the press-fitting portion 62, slipping occurs between the press-fitted portion 64 and the press-fitting portion 62, and accordingly, tooth portions of the serration portions 63 and 65 engage with each other. At this time, the torque is transmitted between the serration portions 63 and 65, and accordingly, the torque is transmitted between the output member 22 and the second shaft 12.

In a normal steering state, the gap between the tooth portions of the serration portions 63 and 65 may be narrowed, then the tooth portions are brought into slight pressure contact (light pressure contact) with each other. Accordingly, when slipping occurs between the press-fitting portion 62 and the press-fitted portion 64, the tooth portions of the serration portions 63 and 65 come into contact with each other and rattling noise can be reduced.

A power transmission surface 73 and a first end face 75 are facing to each other in the axial direction S of the steering shaft 3. A first convex-concave engagement portion 71 is provided on each of the input member main body 201 and the inner race 391. Accordingly, the input member 20 and the inner race 391 are enabled to transmit power. By providing a second convex-concave engagement portion 72 on each of the inner race 391 and the output member 22, the inner race 391 and the output member 22 are enabled to transmit power.

The first convex-concave engagement portion 71 includes first convex portions 74 formed on the power transmission surface 73 as one end face of the input member main body 201, and first concave portions 76 that are formed on the first end face 75 as one end face of the inner race 391 and engage with the first convex portions 74.

The first convex portions 74 are formed at even intervals on the entire circumference of the input member 20. The first concave portions 76 are formed at even intervals on the entire circumference of the inner race 391.

The second axis B of the inner race 391 is inclined by a predetermined angle E with respect to the first axis A of the input member 20 and the output member 22, and accordingly, one first convex portion 74 as a part of the first convex portions 74 and one first concave portion 76 as a part of the first concave portions 76 engage with each other.

The number of first convex portions 74 is different from the number of first concave portions 76. According to the difference between the number of first convex portions 74 and the number of first concave portions 76, differential rotation can be realized between the input member 20 and the inner race 391.

Instead of the first convex portions 74, rollers formed separately from the input member main body 201 may be used. In this case, the "rollers" are disposed on the power transmission surface 73, and are supported rotatably at both ends by retainers.

The power transmission surface 77 and the second end face 79 are facing to each other in the axial direction S of the steering shaft 3. The second convex-concave engagement portion 72 includes second convex portions 78 formed on the power transmission surface 77 as one end face of the output member 22 and second concave portions 80 that are formed on the second end face 79 as the other end face of the inner race 391 and engages with the second convex portions 78.

The second convex portions 78 of the second convex-concave engagement portion 72 are arranged similar to the first convex portions 74, and the second concave portions 80 are arranged similar to the first concave portions 76. Therefore, detailed description of the second convex-concave engagement portion 72 is omitted.

The facing end portions 11b and 12a of the first shaft 11 and the second shaft 12 are supported by a support mechanism 81 coaxially and rotatably relative to each other. The support mechanism 81 includes the input member side tubular portion 202 and an eighth bearing 38.

The input member side tubular portion 202 surrounds the facing end portions 11b and 12a of the first and second shafts 11 and 12. One end of the input member side tubular portion 202 is facing to the first bearing 31 in the radial direction R. The other end of the input member side tubular portion 202 is facing to the end portion 12a of the second shaft 12 in the radial direction R.

On the other end of the input member side tubular portion 202, a bearing holding hole 84 is formed, and the end portion 12a of the second shaft 12 is inserted through the bearing holding hole 84. The eighth bearing 38 is interposed between the end portion 12a of the second shaft 12 and the bearing holding hole 84, and allows the input member side tubular portion 202 and the second shaft 12 to rotate relative to each other.

It is also acceptable that the output member side tubular portion 222 is made to project to one side S1 in the axial direction S with respect to the second shaft 12 and hold the outer race of the eight bearing 38, and the inner race of the eighth bearing 38 is set to hold the facing end portion 11b of the first shaft 11.

Figure 4:
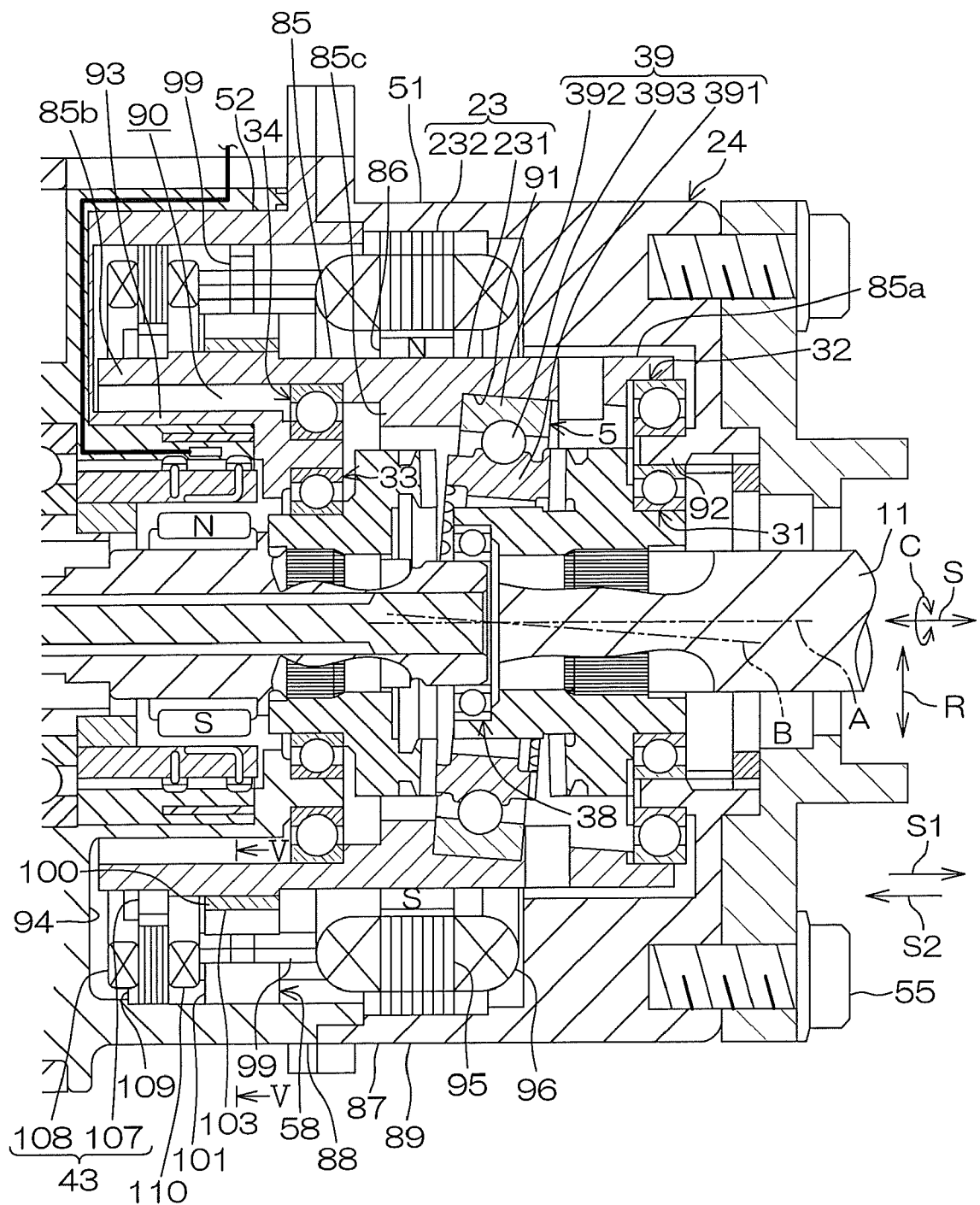
FIG. 4 is an enlarged view of the transmission ratio variable mechanism and the surrounding area thereof.

FIG. 4 is an enlarged view of the transmission ratio variable mechanism 5 of FIG. 2 and the surrounding area thereof. Referring to FIG. 4, the rotor 231 of the transmission ratio variable mechanism motor 23 includes a cylindrical rotor core 85 extending in the axial direction S and a permanent magnet 86 fixed to the outer peripheral surface of the rotor core 85. The axial direction S is the axial direction of the rotor 231.

As a material of the rotor core 85, steel material, aluminum alloy, clad material, and resin material can be used by way of example. When a clad material that is a composite material formed by bonding a plurality of kinds of metals together is used, resonance can be reduced.

The rotor core 85 is housed in the outer tube 89 formed by combination of the outer diameter portions 87 and 88 of the first and second housings 51 and 52. The outer diameter portions 87 and 88 have substantially cylindrical shapes, and are continuously formed to neighbor each other in the axial direction S. The outer periphery of the rotor core 85 is surrounded by the outer tube 89.

The rotor core 85 defines a cylindrical accommodation space 90 on the inner side in the radial direction. On the inner peripheral surface of the rotor core 85, an inclined hole 91 having a central axis set along the second axis B and inclined with respect to the first axis A is formed. To this inclined hole 91, the outer race 392 of the bearing ring unit 39 is press-fitted and fixed, and accordingly, the outer race 392 and the rotor core 85 are coupled rotatably around the first axis A.

The rotor core 85 is supported at both ends by the second bearing 32 and the fourth bearing 34. In detail, the second bearing 32 is disposed between the inner peripheral surface of one end portion 85a of the rotor core 85 and the outer peripheral surface of an annular protruding portion 92 formed on the inner diameter portion on one end of the first housing 51.

The fourth bearing 34 is disposed between the inner peripheral surface of the intermediate portion 85c of the rotor core 85 and the outer peripheral surface of the tip end portion of the inner tube 93 of the second housing 52.

The inner tube 93 is formed to have a cylindrical shape and extends to one side 51 in the axial direction S, and an intermediate portion and a tip end portion thereof are disposed inside the accommodation space 90 of the rotor core 85, and a base end portion thereof is projecting to the other side S2 in the axial direction S with respect to the rotor core 85. The base end portion of the inner tube 93 is extended from the inner diameter portion of the annular joint wall 94. The joint wall 94 extends inward in the radial direction R from the portion on the outer diameter portion 87 side of the second housing 52 of the outer tube 89, and neighbors the other end portion 85b of the rotor core 85 in the axial direction S. The joint wall 94 covers the other end of the second housing 52.

The permanent magnet 86 of the rotor 231 has magnetic poles alternately in the circumferential direction C, and in the circumferential direction C, N poles and S poles are alternately arranged at even intervals. The permanent magnet 86 is fixed to the outer peripheral surface of the intermediate portion 85c of the rotor core 85.

The stator 232 of the transmission ratio variable mechanism motor 23 includes an annular stator core 95 formed by laminating a plurality of electromagnetic steel plates, and electromagnetic coils 96.

The outer peripheral surface of the stator core 95 is fixed to the inner peripheral surface of the outer diameter portion 87 of the first housing 51 by thermal insert, or the like. Around the teeth of the stator core 95, electromagnetic coils 96 are wound.

A bus bar 99 is disposed on the other side S2 in the axial direction S with respect to the stator 232 of the transmission ratio variable mechanism motor 23. The bus bar 99 has an annular shape as a whole and is housed in the second housing 52, and is connected to each electromagnetic coil 96 of the transmission ratio variable mechanism motor 23. This bus bar 99 supplies electric power to each of the electromagnetic coil 96 from the driving circuit. To the bus bar 99, a harness (not shown) for transmitting signals to the outside of the housing 24 is attached.

A lock mechanism 58 is disposed such that its position in the axial direction S overlaps the bus bar 99. The lock mechanism 58 is for restricting rotation of the rotor 231 of the transmission ratio variable mechanism motor 23 when, for example, the power supply of the motor vehicle is turned off or fails.

Figure 5:
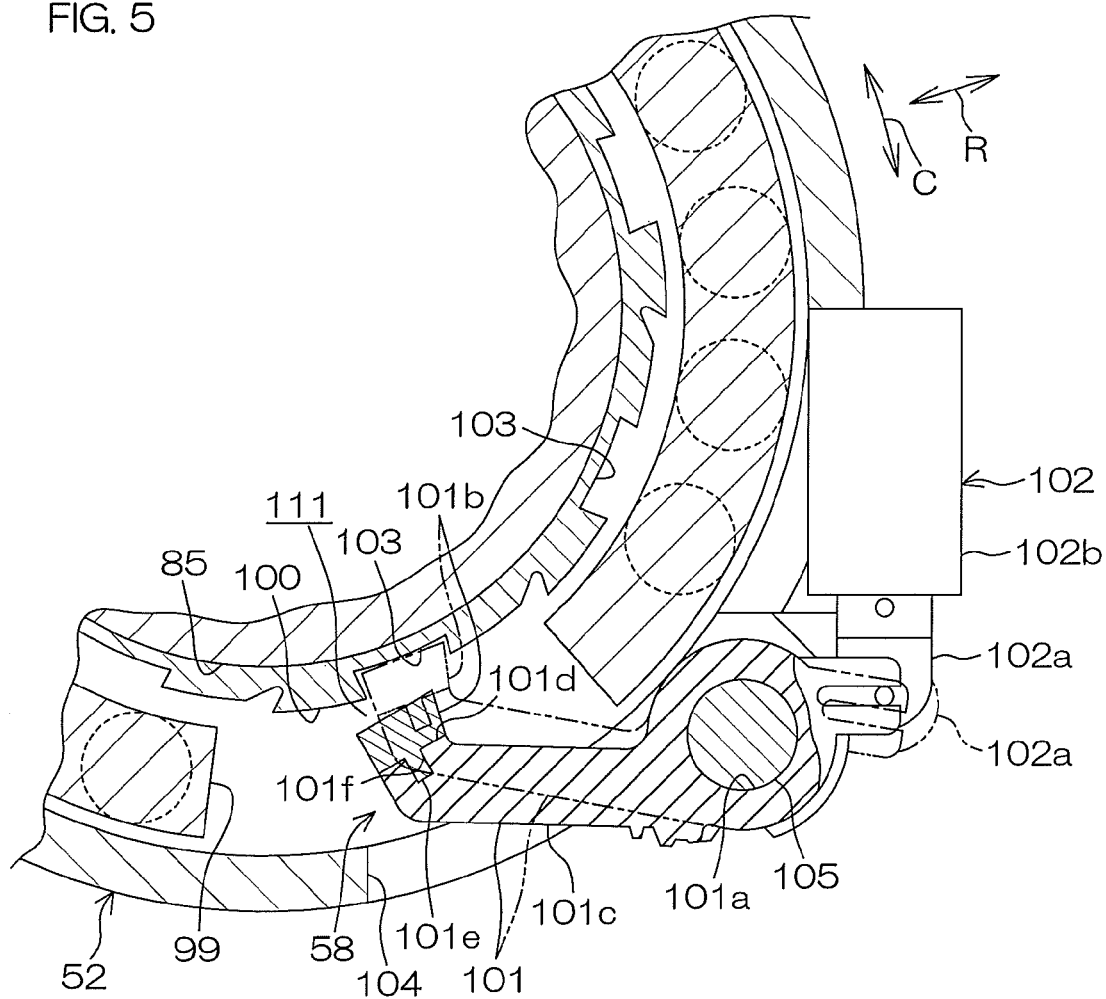
FIG. 5 is a partial sectional view of the surrounding area of a lock mechanism along the V-V line of FIG. 4.

FIG. 5 is a partial sectional view of the surrounding area of the lock mechanism 58 along the V-V line of FIG. 4. Referring to FIG. 4 and FIG. 5, the lock mechanism 58 includes a lock folder 100 as a restricted portion that is coupled to the rotor core 85 rotatably, a lock lever 101 as a restricting portion for restricting rotation of the lock folder 100 by engagement with the lock folder 100, and a solenoid 102 as an actuator for driving the lock lever 101.

The lock folder 100 is formed by cutting an annular member made of metal. A recess 103 is formed on the outer peripheral surface of the lock folder 100. The recess 103 is formed at one or a plurality of positions in the circumferential direction of the lock folder 100.

The lock lever 101 is a lever member extending inward from the outside of the second housing 52, and has a base end portion disposed close to the solenoid 102, and a tip end portion disposed close to the lock folder 100. This lock lever 101 is inserted through a through hole 104 penetrating through the second housing 52 in the radial direction R, and is arranged so as not to come into contact with the second housing 52.

To the base end portion of the lock lever 101, a rod 102a of the solenoid 102 is connected. At the intermediate portion on the base end side of the lock lever 101, a pivot insertion hole 101a is formed. A pivot 105 held by the second housing 52 and extending in the axial direction S is inserted through the pivot insertion hole 101a. By this pivot 105, the lock lever 101 is supported turnably around the pivot 105.

The tip end portion of the lock lever 101 is formed by using an elastic member 101b. The elastic member 101b is for reducing engagement noise when the lock lever 101 engages with the lock folder 100 and restricts this lock folder 100 from rotating, and is formed by using a synthetic resin such as a thermoplastic elastomer.

The elastic member 101b has a protruding shape that can be fitted into the recess 103 of the lock folder 100, and has elasticity higher than that of the metal-made main body portion 101c forming the base end portion and the intermediate portion of the lock lever 101.

The elastic member 101b is injection-molded on the tip end face 101d of the main body portion 101c. The engagement protruding portion 101e formed on the base end portion of the elastic member 101b is fitted into the engagement recess 101f formed on the tip end portion of the main body portion 101c, and accordingly, satisfactory coupling strength between the elastic member 101b and the main body portion 101c is secured. It is also acceptable that the engagement recess is formed on the base end portion of the elastic member 101b, the engagement protruding portion is formed on the tip end portion of the main body portion 101c, and they are fitted to each other.

The solenoid 102 has a solenoid housing 102b fixed to the second housing 52, and a rod 102a supported on this solenoid housing 102b is capable of advancing and retreating with respect to the solenoid housing 102b. To the tip end of the rod 102a, the base end portion of the lock lever 101 is coupled.

The rod 102a is pulled into the solenoid housing 102b while the power supply to the electromagnetic coils (not shown) housed in the solenoid housing 102b is ON. At this moment, the base end portion of the lock lever 101 is attracted to the solenoid housing 102b side, and the elastic member 101b on the tip end portion of the lock lever 101 does not engage with the lock folder 100. Therefore, the lock folder 100 is not restricted from rotating. On the other hand, when the power supply to the electromagnetic coils (not shown) is turned OFF, the rod 102a projects from the solenoid housing 102b as shown by the two-dot-and-dashed line. At this moment, most of the rod 102 is pushed out from the solenoid housing 102b as shown by the two-dot-and-dashed line, and the lock lever 101 turns and the elastic member 101b engages with the recess 103 of the lock folder 100 and restricts rotation of the lock folder 100.

As shown in FIG. 4, a motor resolver 43 is disposed on the other side S2 in the axial direction S with respect to the lock mechanism 58. The motor resolver 43 includes a resolver rotor 107 and a resolver stator 108.

The resolver rotor 107 is fixed to the outer peripheral surface of the other end portion 85b of the rotor core 85. The resolver stator 108 includes an annular stator core 109 press-fitted and fixed to the inner peripheral surface of the outer diameter portion 88 of the second housing 52, and electromagnetic coils 110. The electromagnetic coils 110 are wound around teeth of the stator core 109.

To each electromagnetic coil 110 of the resolver stator 108, the bus bar 99 is connected. This bus bar 99 outputs signals from the electromagnetic coils 110 to the controller.

The lock mechanism 58 and the bus bar 99 are disposed such that their positions in the axial direction S overlap each other while avoiding interference with each other.

In detail, the lock folder 100 and the lock lever 101 of the lock mechanism 58 and a part of the bus bar 99 are disposed at positions overlapping in the axial direction S. In the circumferential direction C, the bus bar 99 is disposed in a region except for the movement range 111 of the lock lever 101.

Figure 6:
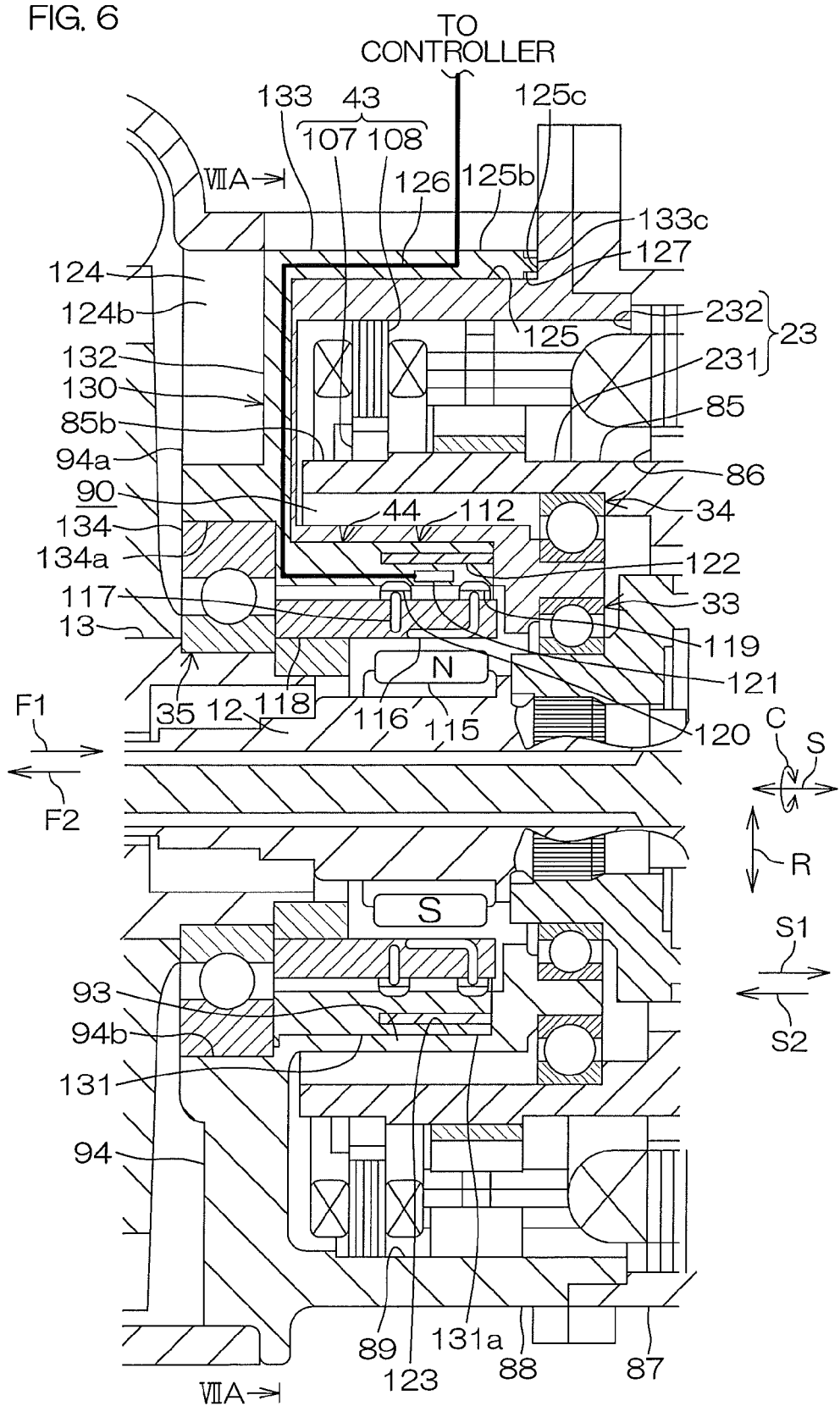
FIG. 6 is an enlarged view of the surrounding area of a torque sensor.

FIG. 6 is an enlarged view of the surrounding area of the torque sensor 44 of FIG. 2. Referring to FIG. 6, the torque sensor 44 is a steering state detection sensor that detects a steering state, and detects a torque applied between the second and third shafts 12 and 13 on the power transmission path.

This torque sensor 44 is partially accommodated in the accommodation space 90 on the other end portion 85b side of the rotor core 85 of the transmission ratio variable mechanism motor 23.

This torque sensor 44 includes a multipolar magnet 115 fixed to the intermediate portion of the second shaft 12, and magnetic yokes 116 and 117 that are signal detection sections as a pair of soft magnetic bodies disposed in a magnetic field that is generated by the multipolar magnet 115 and form a magnetic circuit.

The multipolar magnet 115 is a cylindrical permanent magnet, and has a plurality of poles (the numbers of N poles and S poles are equal) magnetized at even intervals in the circumferential direction.

The magnetic yokes 116 and 117 are facing to the multipolar magnet 115 across a predetermined gap in the radial direction R, and surround the multipolar magnet 115. The magnetic yokes 116 and 117 are molded on the synthetic resin member 118. The synthetic resin member 118 is coupled to one end of the third shaft 13 rotatably.

The torque sensor 44 further provides an annular portion 112. The annular portion 112 surrounds the multipolar magnet 115, the magnetic yokes 116 and 117, the second shaft 12, and the third shaft 13. The annular portion 112 has a ring shape as a whole, and includes a pair of magnet collecting rings 119 and 120 as a signal detection section that induce magnetic fluxes from the magnetic yokes 116 and 117, a Hall IC 121 as a signal detection section disposed between the magnet collecting rings 119 and 120, an electromagnetic shield member 122 surrounding the pair of magnet collecting rings 119 and 120 and the Hall IC 121, and a ring-shaped first synthetic resin portion 131 molding the magnet collecting rings 119 and 120, the Hall IC 121, and the electromagnetic shield member 122.

The pair of magnet collecting rings 119 and 120 are annular members formed by using soft magnetic bodies, and surround the magnetic yokes 116 and 117 and are magnetically coupled to the magnetic yokes 116 and 117. The pair of magnet collecting rings 119 and 120 are arranged to each other while being spaced from each other in the axial direction S.

The Hall IC 121 is for detecting a magnetic flux induced by the magnet collecting rings 119 and 120.

The electromagnetic shield member 122 is a ring-shaped member disposed between the magnetic yokes 116 and 117, the magnet collecting rings 119 and 120, and the Hall IC 121 of the torque sensor 44 and the rotor core 85 of the rotor 231, and blocks electric or magnetic noise from passing through the inside of the electromagnetic shield member 122.

The electromagnetic shield member 122 is preferably made of a material with high magnetic loss or a material with high electric conductivity. As a material with high magnetic loss, for example, ferrite can be used, and as a material with high electric conductivity, for example, copper or aluminum can be used.

The thickness of the electromagnetic shield member 122 is set so as to effectively stop intrusion of electromagnetic noise. This electromagnetic shield member 122 is disposed on the inner side with respect to both of the rotor core 85 of the rotor 231 and the motor resolver 43 in the radial direction R. The electromagnetic shield member 122 is disposed closer to the permanent magnet 86 than the magnet collecting rings 119 and 120 and the Hall IC 121 in the axial direction S. Accordingly, the electromagnetic shield member 122 is disposed between the magnetic yokes 116 and 117, the magnet collecting rings 119 and 120, and the Hall IC 121 and the permanent magnet 86.

By the above-described arrangement, electromagnetic waves from the permanent magnet 86 of the rotor 231 and the motor resolver 43 are prevented from entering the inside of the electromagnetic shield member 122.

Instead of the electromagnetic shield member 122, an arrangement that cancels entering electromagnetic waves out may be adopted.

Figure 7:
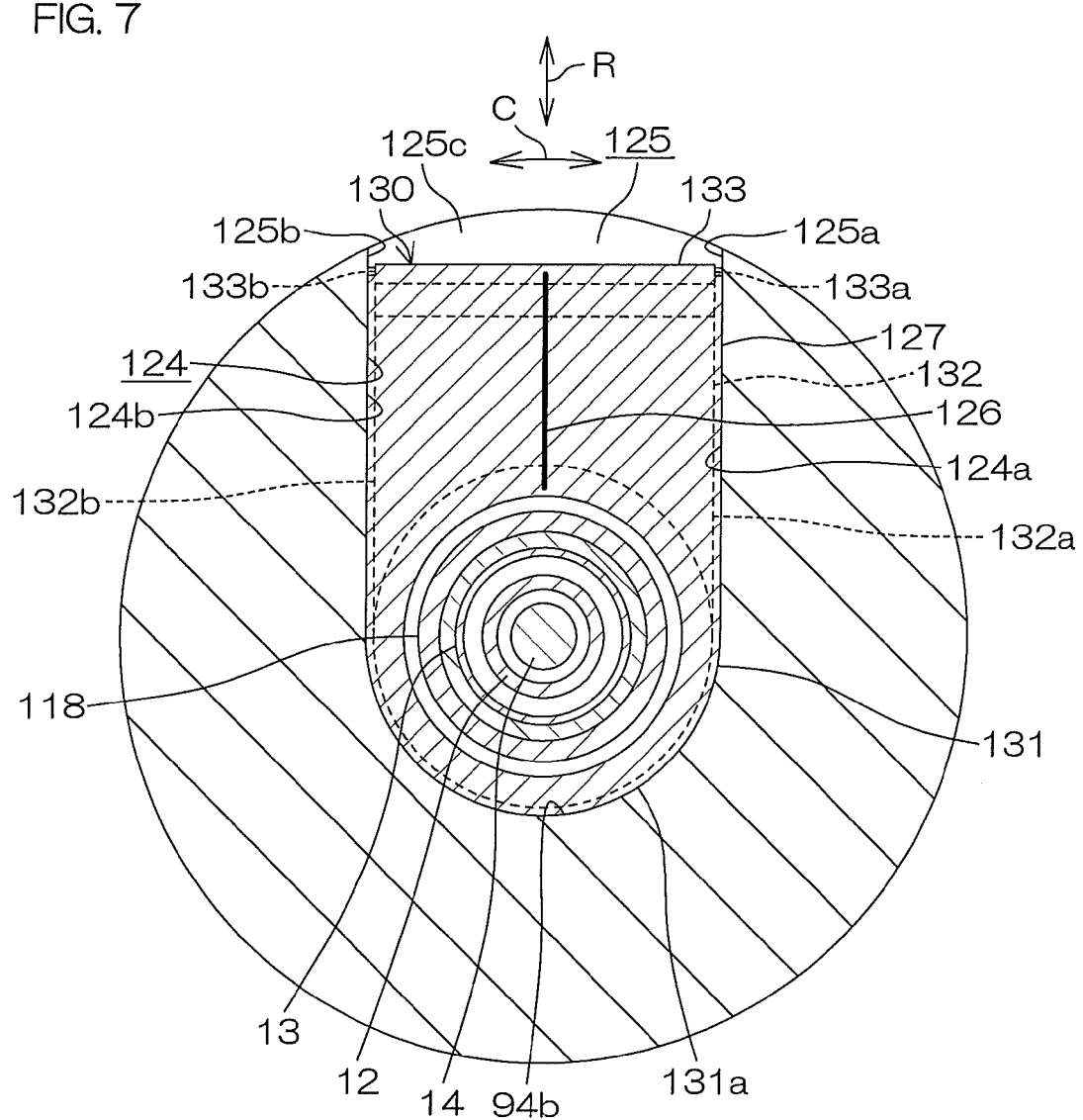
FIG. 7 is a sectional view along the VIIA-VIIA line of FIG. 6.
Figure 8:
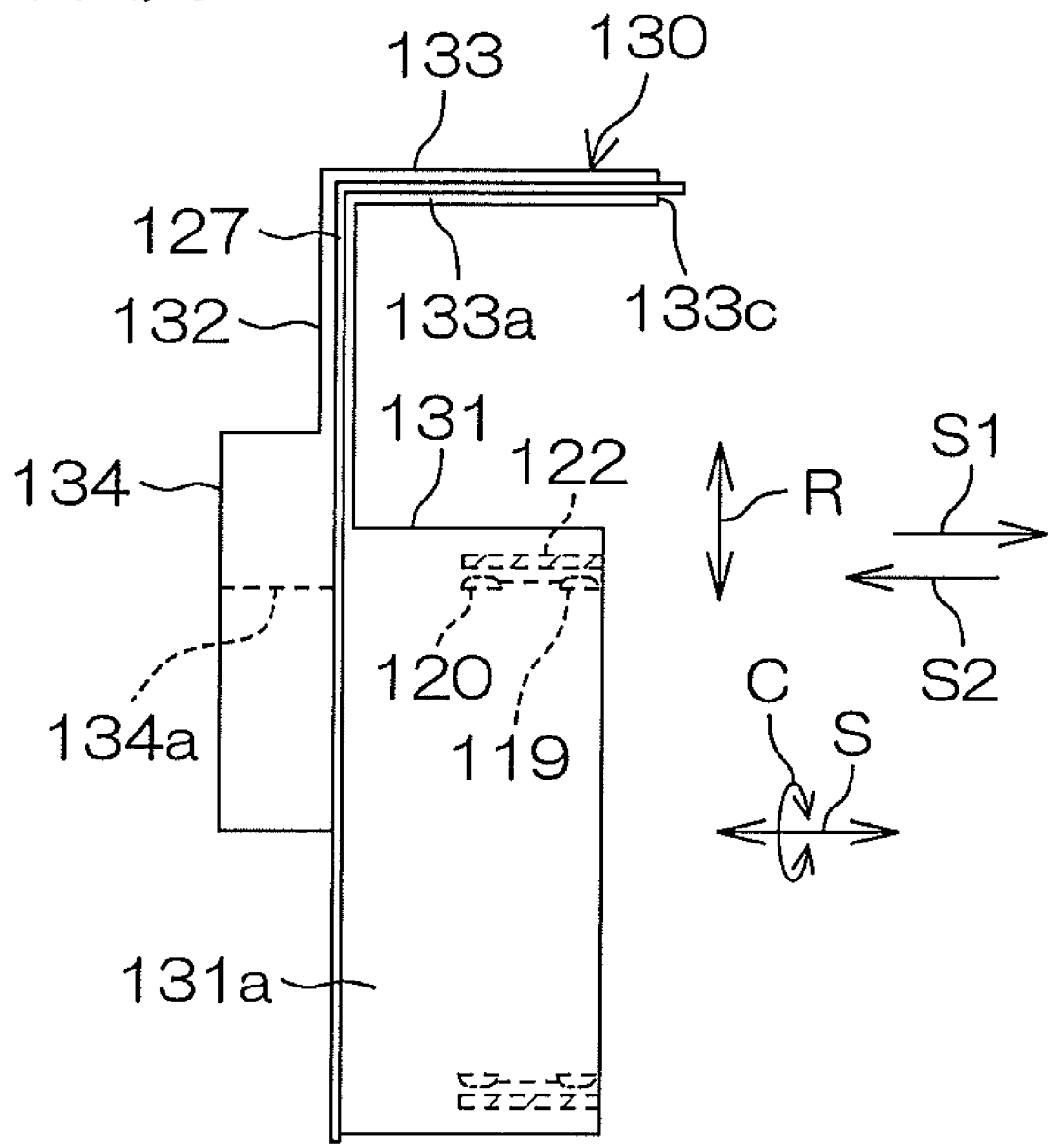
FIG. 8 is a side view of an essential portion of the torque sensor.

FIG. 7 is a sectional view along the VIIA-VIIA line of FIG. 6, and FIG. 8 is a side view of an essential portion of the torque sensor 44. Referring to FIG. 6, FIG. 7, and FIG. 8, the first synthetic resin portion 131 is a synthetic resin member 130 that is an integrally molded item of a synthetic resin with electric insulating properties in conjunction with a second synthetic resin portion 132, a third synthetic resin portion 133, and a fourth synthetic resin portion 134 described later.

Positions in the axial direction S of most of the first synthetic resin portion 131 and the other end portion 85*b* of the rotor core 85 are overlapped with each other, and the end portion on the other side S2 in the axial direction S projects to the other side S2 in the axial direction S with respect to the other end portion 85*b* of the rotor core 85.

The first synthetic resin portion 131 is held by press-fitting and fixation of its outer peripheral surface 131*a* into the holding hole 123 of the inner tube 93 of the second housing 52. Accordingly, the annular portion 112 is held in the holding hole 123. This holding hole 123 is opened in the axial direction S. The holding hole 123 can receive the first synthetic resin portion 131 along a predetermined receiving direction F1 along one side in the axial direction S from the other side S2 (lower side) in the axial direction S.

The second synthetic resin portion 132 is a radially extended portion extended outward in the radial direction R from the end portion on the other side S2 in the axial direction S of the first synthetic resin portion 131. The second synthetic resin portion 132 is formed to have a flat shape extending outward in the radial direction R from a part of the first synthetic resin portion 131 in the circumferential direction C, and neighbors the rotor core 85 in the axial direction S.

This second synthetic resin portion 132 is inserted through a first groove 124 of the second housing 52. The first groove 124 is formed on one end face 94*a* directed in a direction F2 opposite to the receiving direction F1 of the joint wall 94 of the second housing 52, and opened in the direction F2 opposite to the receiving direction F1. The first groove 124 can receive the second synthetic resin portion 132 along the receiving direction F1. The first groove 124 is formed on a part in the circumferential direction C of one end face 94*a*.

The first groove 124 includes a pair of inner side surfaces 124*a* and 124*b* spaced from each other in the circumferential direction C and extending parallel to each other. Between the pair of inner side surfaces 124*a* and 124*b*, the second synthetic resin portion 132 is disposed. The base end portion of the second synthetic resin portion 132 is disposed on the inner side in the radial direction R with respect to the rotor core 85, and has a tip end portion disposed on the outer side in the radial direction R with respect to the rotor core 85.

The third synthetic resin portion 133 is an axial direction extended portion extended to one side S1 in the axial direction S from the tip end of the second synthetic resin portion 132. The third synthetic resin portion 133 extends in the receiving direction F1 from the tip end portion of the second synthetic resin portion 132, and is accommodated in a second groove 125 formed on the portion on the outer diameter portion 88 side of the second housing 52. The second groove 125 communicates with the first groove 124, and is extended to one side S1 in the axial direction S with respect to the first groove 124 and opened outward in the radial direction R. The positions in the axial direction S of the second groove 125 and the third synthetic resin portion 133 overlap at least a part (almost the whole in the present preferred embodiment) of the annular portion 122.

The fourth synthetic resin portion 134 has an arc shape protruding in a second axial direction S2 from the first synthetic resin portion 131. The inner peripheral surface 134*a* of the fourth synthetic resin portion 134 is formed continuously to the inner peripheral surface 94*b* of the joint wall 94, and holds the outer peripheral surface of the outer race of the fifth bearing 35 across the entire circumference in cooperation with the inner peripheral surface 96*b*.

In the synthetic resin member 130, an electric wire 126 for transmitting signals from the Hall IC 121 to the controller is buried. The electric wire 126 has an end electrically connected to the Hall IC 121, and extends from the first synthetic resin portion 131 to the second synthetic resin portion 132 and the third synthetic resin portion 133 of the annular portion 112. The electric wire 126 projects from the synthetic resin member 130 in the annular portion 112, and is electrically connected to the controller.

The synthetic resin member 130 further includes a sealing portion 127 that liquid-tightly seals the portions between the second housing 52, and the first groove 124 and the second groove 125.

The sealing portion 127 is formed to have a narrow and long annular shape, and projects from the outer peripheral surface 131*a* of the other end portion of the first synthetic resin portion 131, the pair of side surfaces 132*a* and 132*b* of the second synthetic resin portion 132, the pair of side surfaces 133*a* and 133*b* of the third synthetic resin portion 133, and the tip end face 133*c* of the third synthetic resin portion 133. This sealing portion 127 is in contact with the inner peripheral surface 94*b* of the joint wall 94 of the second housing 52, the corresponding inner side surfaces 124*a* and 124*b* of the first groove 124, and the corresponding inner side surfaces 125*a*, 125*b*, and 125*c* of the second groove 125.

According to the arrangement described above, a magnetic flux is generated in the magnetic yokes 116 and 117 according to the relative rotation amount of the second and third shafts 12 and 13, and this magnetic flux is induced by the magnet collecting rings 119 and 120 and detected by the Hall IC 121. A torque detection signal of the Hall IC 121 is input into the controller via the electric wire 126. Thus, a magnetic flux density according to a torque applied to the second and third shafts 12 and 13 can be detected.

Here, referring to FIG. 2, the fifth bearing 35 is disposed on the other side S2 in the axial direction S with respect to the torque sensor 44. The fifth bearing 35 supports one end of the third shaft 13 rotatably.

The outer peripheral portion of the second shaft 12 and the inner peripheral portion of the third shaft 13 are supported rotatably relative to each other via the sixth bearing 36. A reduction gear mechanism 26 is housed in a housing chamber 129 defined by an outer diameter portion 128 and an end wall portion 61 of the third housing 53 and the joint wall 94 of the second housing 52. The end wall portion 61 of the third housing 53 supports the third shaft 13 rotatably via a seventh bearing 37.

Figure 9:
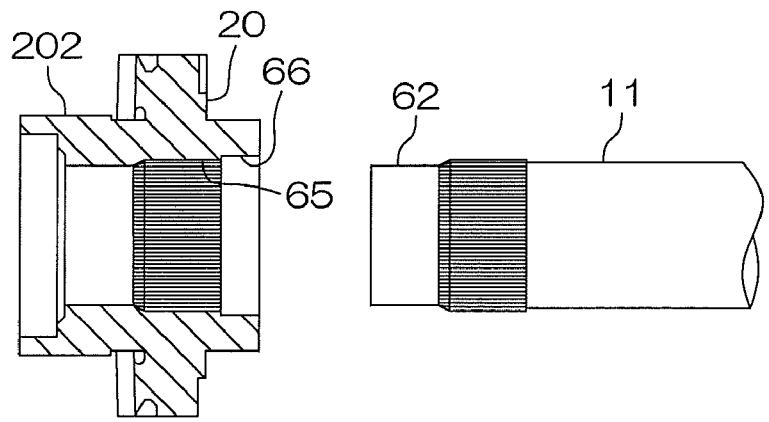
FIG. 9 is a partial sectional view for describing a process of coupling the first shaft and an input member.

In the motor vehicle steering system 1 having the general arrangement described above, the input member 20 and the first shaft 11 are coupled as follows. That is, first, as shown in FIG. 9, the input member 20 and the first shaft 11 that are single items are prepared, and facing each other coaxially such that the press-fitting portion 62 of the first shaft 11 is directed toward the input member 20 side.

Figure 10:
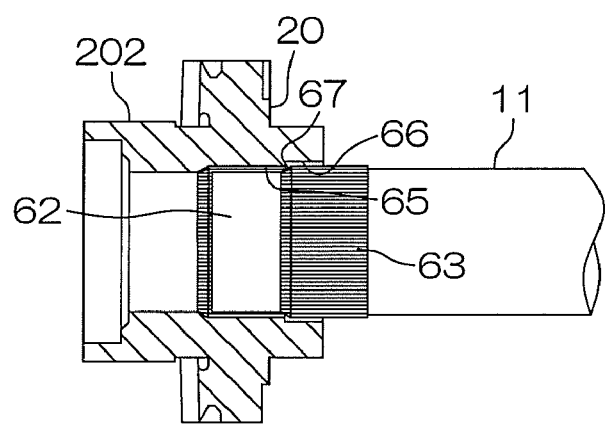
FIG. 10 is a view showing a state in which the first shaft is inserted through the input member.

Next, as shown in FIG. 10, the first shaft 11 is inserted through the input member side tubular portion 202 of the input member 20. Accordingly, the press-fitting portion 62 is loosely fitted on the large diameter portion 66 and on the female serration portion 65 of the input member side tubular portion 202. Then, by an engagement of the guide portion 67 of the male serration portion 63 with the female serration portion 65, tooth portions of these are guided so as to be alternately disposed in the circumferential direction.

Figure 11:
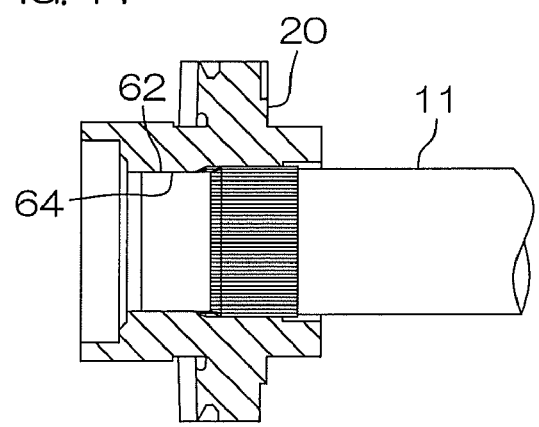
FIG. 11 is a view showing a state in which a press-fitting portion is press-fitted in a press-fitted portion, and these are completely coupled to each other.

After the male serration portion 63 and the female serration portion 65 are fitted to each other, as shown in FIG. 11, the press-fitting portion 62 is press-fitted in the press-fitted portion 64, and these are completely coupled to each other.

Figure 12:
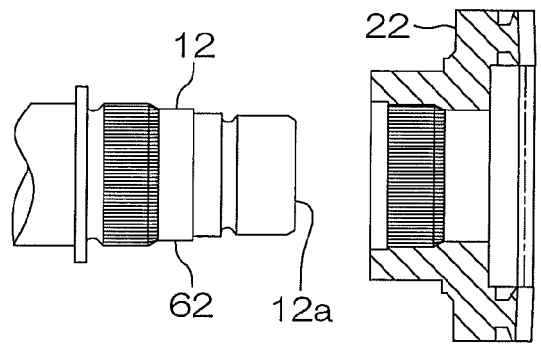
FIG. 12 is a partial sectional view for describing a process of coupling a second shaft and an output member.

The output member 22 and the second shaft 12 are coupled as follows. First, as shown in FIG. 12, the output member 22 and the second shaft 12 of single items are prepared, and are facing to each other coaxially such that the press-fitting portion 62 of the second shaft 12 is directed toward the output member 22 side.

Figure 13:
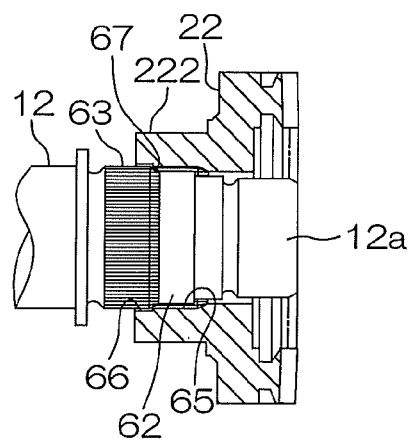
FIG. 13 is a view showing a state in which the second shaft is inserted through the output member.

Next, as shown in FIG. 13, the second shaft 12 is inserted through the output member side tubular portion 22 of the output member 22. Accordingly, one end portion 12a of the second shaft 12 and the press-fitting portion 62 are loosely fitted on the large diameter portion 66 of the output member side tubular portion 222 and on the female serration portion 65. Then, the guide portion 67 of the male serration portion 63 engages with the female serration portion 65, and accordingly, tooth portions of these are guided so as to be disposed alternately in the circumferential direction.

Figure 14:
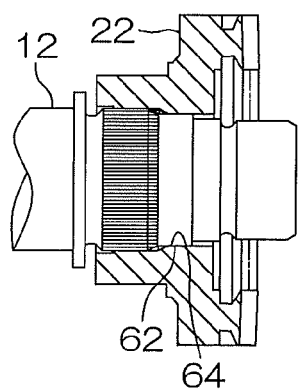
FIG. 14 is a view showing a state in which a press-fitting portion is press-fitted in the press-fitted portion, and these are completely coupled to each other.

After the male serration portion 63 and the female serration portion 65 are fitted to each other, as shown in FIG. 14, the press-fitting portion 62 is press-fitted in the press-fitted portion 64, and these are completely coupled to each other.

Referring to FIG. 1, when the motor vehicle travels at a comparatively low speed, the motor vehicle steering system 1 arranged as described above can perform a function of assisting driver's steering by amplifying the steering angle θ1 by changing the transmission ratio θ2/θ1 in the transmission ratio variable mechanism 5 to a higher value by driving the transmission ratio variable mechanism motor 23.

When the motor vehicle travels at a comparatively high speed, the motor vehicle steering system performs stability control (posture stabilization control) of the motor vehicle by changing the transmission ratio θ2/θ1 in the transmission ratio variable mechanism 5 to a lower value by driving the transmission ratio variable mechanism motor 23.

As described above, according to the present preferred embodiment, the annular portion 112 of the torque sensor 44 and the rotor core 85 of the rotor 231 of the transmission ratio variable mechanism motor 23 can be disposed so as to overlap in the axial direction S, so that the entire length of the motor vehicle steering system 1 in the axial direction S can be shortened.

The annular portion 112 of the torque sensor 44 can be held in the accommodation space 90 by the inner tube 93 of the housing 24. Further, the annular portion 112 can be inserted in the holding hole 123 of the inner tube 93 along the axial direction S (receiving direction F1), so that the torque sensor 44 can be disposed on the deeper side of the rotor core 85, and the dead space inside the rotor 231 can be effectively utilized.

By providing the second and third synthetic resin portions 132 and 133, the portion connected to the first synthetic resin portion 131 can be extended outward in the radial direction of the rotor core 85, and eventually, extended so as to be exposed from the housing 24. Accordingly, the electric wire 126 that transmits torque detection signals can be inserted in the first to third synthetic resin portions 131 to 133 and extended to the outside of the housing 24. As a result, a torque detection signal can be transmitted to the controller outside the housing 24.

Further, by disposing the electromagnetic shield member 122 between the magnetic yokes 116 and 117, the magnet collecting rings 119 and 120, and the Hall IC 121 of the torque sensor 44 and the rotor 231, the torque sensor 44 can be prevented from detecting electromagnetic noise from the outside.

Further, the input member 20 and the output member 22 and the corresponding first and second shafts 11 and 12 are coupled to each other by press-fitting and fixing in a torque transmittable manner, and coupled to each other in a torque transmittable manner by serration fitting.

By press-fitting and fixing the input member 20 and the first shaft 11 to each other, the first shaft 11 and the input member 20 can be highly accurately positioned relative to each other. Similarly, by press-fitting and fixing the output member 22 and the second shaft 12, the second shaft 12 and the output member 22 can be highly accurately positioned relative to each other.

Further, by serration-coupling the input member 20 and the first shaft 11 to each other, even a high torque can be reliably received between these input member 20 and first shaft 11, and relative phases (positions in the circumferential direction) of these can be restrained from significantly shifting. Accordingly, the phases of the first shaft 11 and the steering member 2 in a steering neutral state can be restrained from shifting, and a driver can be prevented from feeling physical disorder in steering.

Similarly, by serration-coupling the output member 22 and the second shaft 12, even a large torque can be reliably received between the output member 22 and the second shaft 12, and relative phases of these (positions in the circumferential direction) can be restrained from significantly shifting. Accordingly, the phases of the second shaft 12 and the steering member 2 in the steering neutral state can be restrained from shifting, and a driver can be prevented from an uncomfortable feeling in steering.

In the support mechanism 81, by supporting both of the input member 20 and the output member 22 by using the eighth bearing 38, the bearing can be commonly used for supporting these members 20 and 22, and the number of bearings can be reduced, and the reduction in number of components reduces the manufacturing cost.

That is, the bearings supporting the input member 20 and the output member 22 are only three bearings of the first, third, and eighth bearings 31, 33, and 38. Therefore, for example, different from the case adopting an arrangement in which both ends of the input member are supported by a pair of bearings and both ends of the output member are supported by another pair of bearings, there is no need to prepare four bearings.

The number of bearings supporting the input member 20 and the output member 22 is only three, so that the space for the bearings supporting the input member 20 and the output member 22 can be shortened in the axial direction S, and the length of the motor vehicle steering system 1 in the axial direction S can be further shortened.

In addition, the facing end portions 11b and 12a of the first and second shafts 11 and 12 can be prevented from inclining (tilting) with respect to each other by the eighth bearing 38, and as a result, the engagement between the input member 20 and the output member 22 supported by these shafts 11 and 12 can be kept highly accurate.

Further, by providing the elastic member 101b on the tip end portion of the lock lever 101 of the lock mechanism 58, the engagement noise when the lock lever 101 and the lock folder 100 engage with each other can be reliably reduced, and the region for providing the elastic member 101b in the lock mechanism 58 can be minimized, and the cost of injection molding can be reduced. There is no need to provide an elastic member on the lock folder 100, so that the shape and manufacturing process of the lock folder 100 can be simplified.

Further, the lock lever 101 and the lock folder 100 of the lock mechanism 58 and the bus bar 99 are disposed between the stator 232 of the transmission ratio variable mechanism motor 23 and the resolver stator 108, and the bus bar 99 is disposed so as to avoid the movement range 111 of the lock lever 101. Accordingly, the lock lever 101 and the lock folder 100 can be disposed so as to overlap the bus bar 99 in the axial direction S, so that the length of the motor vehicle steering system 1 in the axial direction S can be further shortened.

The wiring relating to the stator 232, the wiring relating to the resolver stator 108, and the wiring relating to the electromagnetic solenoid 102 can be extended from positions close to each other to the outside of the housing 24, and these wirings can be easily laid out.

Further, by providing the sealing portion 127 on the synthetic resin member 130, a lubricant such as grease filled in the region of engagement between the worm shaft 27 and the worm wheel 28 of the reduction gear mechanism 26 can be prevented from leaking between the second housing 52 and the synthetic resin member 130. By providing the synthetic resin member 130 and the sealing portion 127 integrally, it becomes unnecessary to provide a separate sealing structure, and as a result, the motor vehicle steering system 1 can be further shortened in the axial direction S.

As described above, by making the length in the axial direction S of the motor vehicle steering system 1 shorter, the disposition space for providing an electric tilt mechanism including an electric motor and a tilt telescopic mechanism and a shock absorption stroke for absorbing shock of a second collision of the motor vehicle can be sufficiently secured. Further, the degree of freedom of layout of the motor vehicle steering system 1 inside the cabin can be increased.

The second housing 52 houses the rotor 231 of the transmission ratio variable mechanism motor 23, has a function as a transmission ratio variable mechanism housing, holds the annular portion 112 of the synthetic resin member 130 of the torque sensor 44 of the steering assisting mechanism 19, and has a function as a steering assisting mechanism housing. Thus, the second housing 52 can be commonly used as the transmission ratio variable mechanism housing and the steering assisting mechanism housing, and as a result, the manufacturing cost can be reduced. The inner tube 93 of the second housing 52 can be formed to be thin, and the second and fourth bearings 32 and 34 supporting the rotor core 85 can be disposed inside the rotor core 85. A simple arrangement in which these bearings 32 and 34 are disposed inside the rotor core 85 can be realized, so that the manufacturing cost can be further reduced.

Further, the outer peripheral surface of the rotor core 85 can be formed to be a substantially flat surface, so that the labor for processing the rotor core 85 can be reduced, and the reduction in manufacturing cost of the rotor core 85 further reduces the manufacturing cost of the motor vehicle steering system 1.

Further, the annular portion 112 of the torque sensor has an annular shape that does not protrude in the radial direction R, so that the rotor core 85 surrounding the annular portion 112 can be formed to have a small diameter. Accordingly, the second and fourth bearings 32 and 34 supporting the rotor core 85 can be downsized, and the cost of these bearings 32 and 34 can be greatly reduced.

The present invention is not limited to the contents of the preferred embodiment described above, but can be variously changed within the scope of the present invention.

Figure 15:
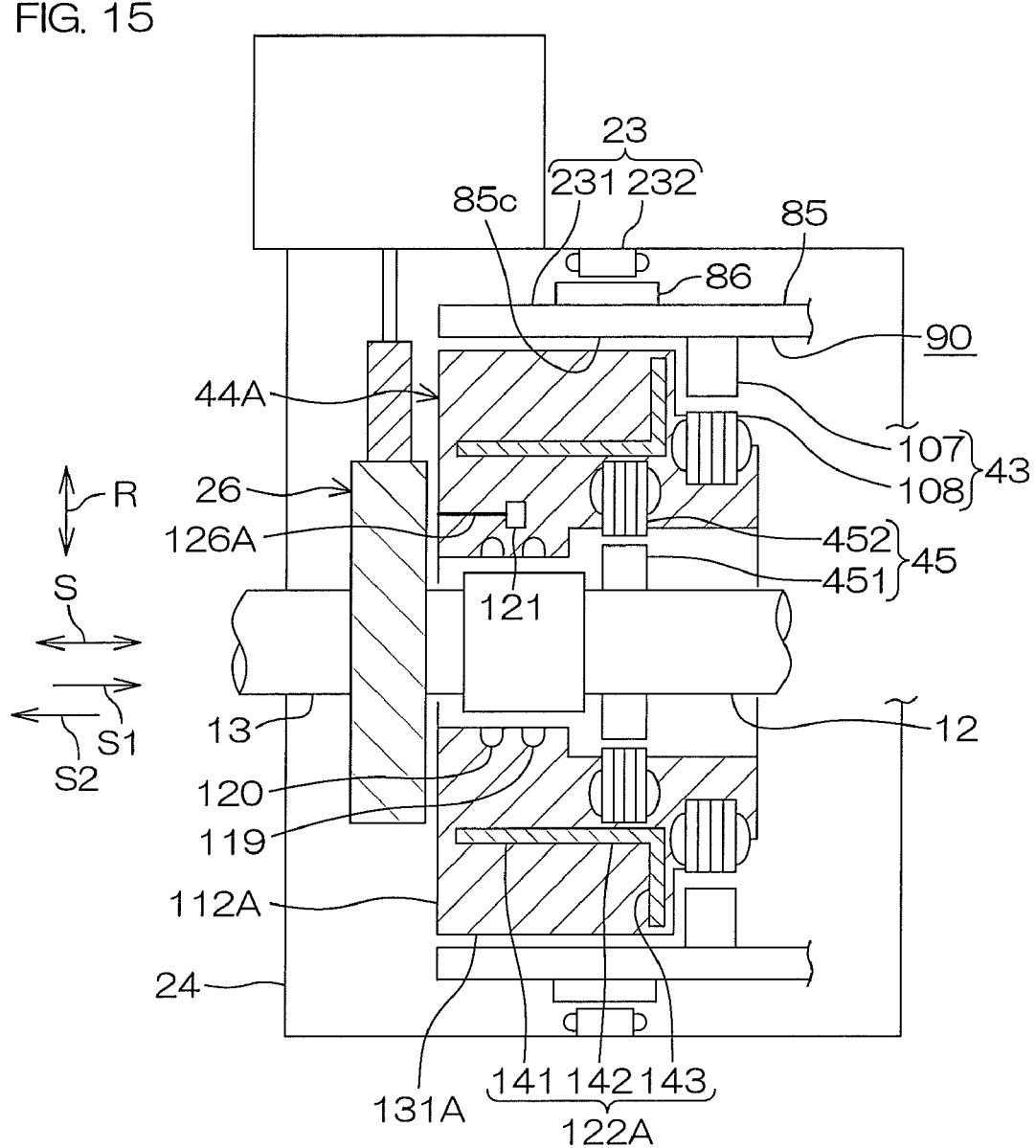
FIG. 15 is a schematic partial sectional view of an essential portion according to another preferred embodiment of the present invention.

For example, as shown in FIG. 15, the whole torque sensor 44A may be disposed inside the accommodation space 90. Hereinafter, differences from the preferred embodiment shown in FIG. 1 to FIG. 9 will be described, and the same components as in the preferred embodiment are designated by the same reference numerals and description of these will be omitted.

Major differences of the preferred embodiment shown in FIG. 15 from the preferred embodiment shown in FIG. 1 to FIG. 9 are (i) disposition of the whole torque sensor 44A inside the accommodation space 90, (ii) disposition of the whole steered angle sensor 45 that is a rotation angle detection sensor as a steering state detection sensor inside the accommodation space 90, and (iii) disposition of the whole motor resolver 43 that is a rotation angle detection sensor as a steering state detection sensor inside the accommodation space 90.

The annular portion 112A of the torque sensor 44A is facing to the rotor core 85 in the radial direction R across the entire region in the axial direction S. The electric wire 126A projects from the end portion on the other side S2 in the axial direction S of the first synthetic resin portion 131A of the annular portion 112A, and is extended to the outside of the housing 24.

The steered angle sensor 45 is disposed on one side 51 in the axial direction S with respect to the pair of magnet collecting rings 119 and 120, includes a rotor 451 coupled rotatably to the second shaft 12 as a predetermined shaft member on the power transmission path, and a stator 452 as a signal detection section surrounding this rotor 451, and detects the rotation angle of the second shaft 12. At least a part of the stator 452 is buried in the first synthetic resin portion 131A of the annular portion 112A such that the stator is held by the first synthetic resin portion 131A. A signal detected by the stator 452 is input into the controller via an electric wire not shown.

The motor resolver 43 is disposed on the other side S2 in the axial direction S with respect to the steered angle sensor 45. A resolver rotor 107 of the motor resolver 43 is coupled rotatably to the inner peripheral surface of the rotor core 85. The resolver stator 108 of the motor resolver 43 is a signal detection section, and a signal detected by the resolver stator 108 is output to the controller via an electric wire not shown.

At least a part of this resolver stator 108 is buried in the first synthetic resin portion 131A such that the resolver stator 108 is held by the first synthetic resin portion 131A.

The permanent magnet 86 of the rotor 231 of the transmission ratio variable mechanism 5 and the stator 232 are disposed on the intermediate portion 85c of the rotor core 85.

The electromagnetic shield member 122A includes a first tubular portion 141 surrounding the pair of magnet collecting rings 119 and 120 and the outer periphery of the Hall IC 121 of the torque sensor 44, a second tubular portion 142 connected to the first tubular portion 141 and surrounding the outer periphery of the stator 452 of the steered angle sensor 45, and an annular flange portion 143 that extends outward in the radial direction R from one end of the second tubular portion 142 and is disposed between the permanent magnet 86 of the rotor 231 and the motor resolver 43.

The first and second tubular portions 141 and 142 are disposed on the inner side in the radial direction R with respect to the permanent magnet 86. The flange portion 143 is disposed between the permanent magnet 86 and the motor resolver 43 in the axial direction S.

According to the above preferred embodiment, the steered angle sensor 45 and the motor resolver 43 can be disposed so as to overlap the rotor core 85 of the rotor 231 in the axial direction S, so that the entire length of the system 1 in the axial direction 1 can be further shortened.

In the present preferred embodiment, only parts of the steered angle sensor 45 and the motor resolver 43 may be disposed inside the accommodation space 90.

What is claimed is:

1. A motor vehicle steering system comprising: a differential mechanism that includes a first shaft connected to a steering member and a second shaft connected to a turning mechanism, coupled coaxially to each other; and a transmission ratio variable motor disposed coaxially with the first and second shafts for driving the differential mechanism, wherein
the transmission ratio variable motor includes a tubular rotor,
an accommodation space is defined on the inner side in the radial direction of the tubular rotor, and
at least one of predetermined sensors and the differential mechanism provided in the motor vehicle steering system are disposed in the accommodation space, and accordingly, the differential mechanism, the transmission ratio variable motor, and the at least one of the sensors are disposed so as to overlap along the axial direction as viewed in a direction orthogonal to the axial direction including the first shaft and the second shaft coupled to each other.

2. The motor vehicle steering system according to claim 1, wherein the at least one of sensors includes a steering state detection sensor that detects a steering state.

3. The motor vehicle steering system according to claim 2, wherein the steering state detection sensor has a signal detection section, and include a torque sensor that detects a torque to be applied to a predetermined shaft member on a power transmission path between the steering member and the turning mechanism by the signal detection section.

4. The motor vehicle steering system according to claim 3, wherein an electromagnetic shield member is disposed between the signal detection section and the rotor.

5. The motor vehicle steering system according to claim 4, wherein
the torque sensor includes an annular portion surrounding the predetermined shaft member, and
the annular portion includes a ring-shaped first synthetic resin portion molding the signal detection section and the electromagnetic shield member.

6. The motor vehicle steering system according to claim 3, further comprising a housing for accommodating the rotor, wherein
the housing includes an outer tube surrounding the outer periphery of the rotor, a joint wall that extends inward in the radial direction from the outer tube and neighbors with the rotor in the axial direction of the rotor, and an inner tube extending in the accommodation space for the rotor from the joint wall,
the torque sensor includes an annular portion surrounding the predetermined shaft members,
the inner tube has a holding hole for holding the annular portion, and
the holding hole is opened in the axial direction of the rotor and can receive the annular portion along a predetermined receiving direction along the axial direction of the rotor.

7. The motor vehicle steering system according to claim 6, wherein the torque sensor includes a radially extended portion that extends outward in the radial direction of the annular portion from the annular portion and neighbors with the rotor in the axial direction of the rotor.

8. The motor vehicle steering system according to claim 7, wherein an electric wire that transmits torque detection signals from the signal detection section is inserted in the annular portion and the radially extended portion, and the electric wire can transmit torque detection signals to a controller outside the housing.

9. The motor vehicle steering system according to claim 7, wherein the radially extended portion is formed by a second synthetic resin portion.

10. The motor vehicle steering system according to claim 1, wherein the steering state detection sensor includes a rotation angle detection sensor that detects a rotation angle of the predetermined shaft members or rotor on the power transmission path between the steering member and the turning mechanism.

11. The motor vehicle steering system according to claim 10, wherein an electromagnetic shield member is disposed between the signal detection section of the rotation angle detection sensor and the rotor.

* * * * *